United States Patent [19]

Nair et al.

[11] Patent Number: 5,817,451

[45] Date of Patent: Oct. 6, 1998

[54] FLUORINATED PARTICLES AS LUBRICANTS FOR TRANSPARENT MAGNETIC RECORDING MEDIA

[75] Inventors: Mridula Nair, Penfield; George L. Oltean; Tamara K. Osburn, both of Rochester, all of N.Y.

[73] Assignee: Eastman Kodak Company, Rochester, N.Y.

[21] Appl. No.: 788,474

[22] Filed: Jan. 28, 1997

[51] Int. Cl.$^6$ ............................... G03K 1/76; G11B 5/708
[52] U.S. Cl. ..................... 430/523; 430/496; 430/501; 430/140; 428/694 BP; 428/694 BF; 428/695
[58] Field of Search ..................... 430/523, 496, 430/501, 140; 428/694 BP, 694 BF, 695

[56] References Cited

U.S. PATENT DOCUMENTS

| 3,782,947 | 1/1974 | Krall | 430/140 |
|---|---|---|---|
| 3,862,860 | 1/1975 | Pardee et al. | 427/352 |
| 3,998,989 | 12/1976 | Pardee et al. | 428/409 |
| 4,279,945 | 7/1981 | Audran et al. | 430/140 |
| 4,990,276 | 2/1991 | Bishop et al. | 252/62.54 |
| 5,252,444 | 10/1993 | Yamada et al. | 430/503 |
| 5,427,900 | 6/1995 | James et al. | 430/496 |
| 5,432,050 | 7/1995 | James et al. | 430/496 |
| 5,434,037 | 7/1995 | Wexler et al. | 430/496 |
| 5,436,120 | 7/1995 | Wexler et al. | 430/496 |
| 5,457,012 | 10/1995 | Nair et al. | 430/495.1 |
| 5,531,913 | 7/1996 | Nair et al. | 252/62.53 |

FOREIGN PATENT DOCUMENTS

| 686172 | 5/1964 | Canada . |
|---|---|---|
| 0 552 617 | 7/1993 | European Pat. Off. . |

*Primary Examiner*—Mark F. Huff
*Attorney, Agent, or Firm*—Carl F. Ruoff

[57] ABSTRACT

The present invention is an imaging element which includes a support and at least one image forming layer superposed on the support. A transparent magnetic layer is superposed on the support and includes magnetic particles, fluorinated polymeric particles having a size of from 0.01 to 1.5 μm, and a water dispersible binder, the transparent magnetic layer having a weight ratio of magnetic particles to aqueous dispersible binder of from 0.1:100 to 30:100.

19 Claims, No Drawings

FLUORINATED PARTICLES AS LUBRICANTS FOR TRANSPARENT MAGNETIC RECORDING MEDIA

FIELD OF THE INVENTION

This invention relates to imaging elements and more particularly to photographic elements having a light-sensitive silver halide layer, a transparent magnetic recording layer containing fluorinated particles which function as lubricants.

BACKGROUND OF THE INVENTION

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentration of magnetizable particles.

U.S. Pat. No. 3,782,947 discloses a photographic product which carries magnetic particles distributed across the image area of the product. The particle distribution and sizes are so designed that the composite granularity's of the photographic and magnetic recording media are such that the magnetic distribution is essentially transparent in a photographic sense.

U.S. Pat. No. 4,279,945 discloses a process of preparing magnetic recording elements containing a transparent recording layer. According to this patent, the magnetic recording and reproducing characteristics obtained are comparable to conventional opaque magnetic layers without the need for matching the granularity of a magnetic medium to that of photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refractive index that is substantially the same as that of the binder.

Elements of the type described in the above-cited patent have not achieved widespread commercial success for various reasons. For example, the elements described in U.S. Pat. No. 4,279,945, as indicated by the Figure therein, are substantially opaque at wavelengths less than about 500 nm and thus are not useful in color films. Further, the disclosed process requires that the magnetic recording layer be calendared while it is in a malleable state and/or that a transparent liquid be imbibed into the magnetic recording layer. On the other hand, U.S. Pat. No. 3,782,947 contemplates coating a dispersion containing magnetic particles onto a film base. However, the quantity of solvent required in such a process is unattractive from both an economic and environmental standpoint. Additionally, in continuous wide web coating techniques adapted for commercial manufacturing operations, solvent attack on the film base can render the element unusable, resulting in unacceptable manufacturing inefficiencies and excessive costs. Moreover, it is difficult to prepare magnetic recording layers in such a coating process having a thickness of less than about 5 microns.

U.S. Pat. No. 4,990,276 discloses a dispersion of magnetic particles, a dialkylester of phthalic acid and a dispersing agent. U.S. Pat. No. 5,254,449 discloses the use of such a dispersion to provide a substantially transparent magnetic recording layer in the preparation of a novel photographic element. The process described in this patent calls for dilution of the dispersion with a binder in an organic solvent such as a mixture of methylene chloride and methanol, to form a casting composition. The casting composition is then extruded under pressure onto a photographic support.

U.S. Pat. Nos. 5,427,900 and 5,432,050 describe transparent magnetic recording layers for use in photographic elements wherein organic solvents are used for the preparation of a dispersion containing the magnetic particles.

U.S. Pat. No. 5,457,012 describes a magnetic recording layer which has excellent magnetic characteristics and which is photographically transparent. The stable aqueous dispersion of the magnetic layer comprises a dispersion of magnetic particles in an aqueous medium which contains an anionic dispersant having an HLB (hydrophilic/lypophilic balance) number of at least eight. The dispersant preferably is an amphipathic water-soluble or water-dispersible organic compound. A film-forming binder such as gelatin, or other hydrophilic colloid, in an aqueous medium can be added to the dispersion and the resulting coating composition coated on a support to yield a transparent magnetic layer.

It is evident that providing a photographic element with a magnetic layer of a desired transparency without the use of an organic solvent is desirable. It is also evident that such a layer must be read by a magnetic reader/recorder reliably and consistently.

The photographic element and particularly the transparent magnetic recording layer provided thereon must be capable of repeated use in both the recording and reading mode and, therefore, must be durable, abrasion resistant and scratch resistant so as not to adversely affect the quality of the photographic element. For example, during the residence of the film in a camera, entries may be made to the magnetic recording layer for every exposure, and an indeterminate number of read operations are conducted depending on the particular application to which the film is used. This also is true in the processing of the film and in subsequent use of the processed film for additional copies, enlargements and the like.

U.S. Pat. Nos. 3,862,860 and 3,998,989 describe the use of tetrafluoroethylene telomer in combination with a copolymer of vinyl chloride and trifluorochloroethylene for improving lubricity and abrasion resistance of photographic films. However, these patents teach that tetrafluoroethylene telomer is coatable only from highly fluorinated solvents. Such highly fluorinated solvents are environmentally unacceptable and not suitable for coating large quantities of photographic film and paper.

In general, the fluorinated polymer materials described in photographic elements are not for providing increased lubricity. For example, in EP 0552617, a layer containing a mixture of a metallic oxide sol and a fluorine-containing copolymer is described. However, this layer is not an outermost layer and an outermost layer which includes wax is required to provide lubricity.

It would be highly desirable to provide photographic elements having a transparent magnetic recording layer that demonstrates improved magnetic performance, improved photographic performance, improved lubricity, improved running durability and scratch resistance while minimizing the extent to which the element abrades contact surfaces. It would be highly desirable to provide such a layer without the use of a lubricating or protective overcoat to minimize manufacturing cost and spacing losses at the magnetic head-film interface. It would also be highly desirable to provide a magnetic coating that minimizes head clogging, thereby minimizing the need for abrasive particles. Finally, it would be highly desirable to provide such a layer from an aqueous based coating. Because of the curl of the element, primarily due to the photographic layers and core set, the film must be held tightly against the magnetic heads by high pressures in order to maintain film flatness in the recording and reading zones. This requires an outer surface of the imaging element having a low coefficient of friction. These goals are extremely difficult to achieve because of the nature and concentration of the magnetic particles required to provide sufficient signal to write and read magnetically stored data. Thus, all of these various characteristics must be considered both independently and cumulatively in order to arrive at a commercially viable photographic element containing a transparent magnetic recording layer that will withstand repeated and numerous passages through the recording and reading zones of a suitable apparatus.

SUMMARY OF THE INVENTION

The present invention is an imaging element which includes a support and at least one image forming layer superposed on the support. A transparent magnetic layer is superposed on the support and includes magnetic particles, fluorinated polymeric particles having a size of from 0.01 to 1.5 μm, and a water dispersible binder, the transparent magnetic layer having a weight ratio of magnetic particles to aqueous dispersible binder of from 0.1:100 to 30:100.

In a preferred embodiment the imaging element is a photographic element.

DETAILED DESCRIPTION OF THE PREFERRED EMBODIMENTS

The present invention provides a transparent magnetic recording layer for an imaging element. The transparent magnetic recording layer includes an aqueous dispersible binder, magnetic particles, fluoropolymer particles as the lubricant, and optionally, abrasive particles for head cleaning.

The magnetic layer may comprise, for example, fine ferromagnetic powders such as ferromagnetic gamma-iron oxides, cobalt-surface treated ferromagnetic iron oxides, cobalt-doped ferromagnetic iron oxides, cobalt-containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloy powders and the class of ferromagnetic ferrite powders, including barium ferrites. Additionally, the above-mentioned powder particles may be modified to provide lower light extinction and scattering coefficients by providing them with a shell of at least the same volume of the magnetic core, of a lower refractive index material that has its refractive index lower than the transparent polymeric material used to form the magnetizable layer. Typical shell materials may include amorphous silica, vitreous silica, glass, calcium fluoride, magnesium fluoride, lithium fluoride, polytetrafluoroethylene and fluorinated resins.

Examples of the ferromagnetic alloy powders include those comprising at least 75% by weight of the weight of the metals which comprise at least 80% by weight of at least one ferromagnetic metal alloy (such as Fe, Co, Ni, Fe—Co, Fe—Ni, Co—Ni, Co—Ni—Fe) and 20% or less of other components such as Al, Si, S, Sc, Di, V, Cr, Mn, Cu, Zn, Y, Mo, Rh, Re, Pd, Ag, Sn, B, Ba, Ta, W, Au, Hg, Pb, La, Ce, Pr, Nb, Te, and Bi. The ferromagnetic materials may contain a small amount of water, hydroxide or an oxide. In addition, magnetic oxides with a thicker layer of lower refractive index oxide or other material having a lower optical scattering cross-section as taught by U.S. Pat. No. 5,252,444 may also be used. In addition, U.S. Pat. No. 5,457,012 describes a stable aqueous dispersion of magnetic particles. This dispersion is particularly useful for forming a transparent magnetic layer on a photographic support.

The dispersion contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least $30m^2/g$, more preferably of at least $40m^2/g$. Typical acicular particles of this type include for example, particles of ferro and ferro iron oxides such as gamma-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, maganese, chromium, or the like as is known in the art.

A preferred particle consists of Co surface treated $\gamma$-$Fe_2O_3$ having a specific surface area of greater than $40m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

Fluoropolymer particles such as polytetrafluoroethylene (PTFE), fluorinated ethylene propylene (FEP), perfluoroalkoxy (PFA) function as the lubricant in the transparent magnetic layer. Examples of such particles include fluoropolymer dispersions from ICI, such as those commercially sold under the names of AD1, AD133, AD2, AD639, AD730 and the like; Teflon dispersions sold by DuPont under the names PFA 335, Teflon FEP120, Teflon TE-3170, Teflon 30; Teflon fluoroadditive powders sold by DuPont under the names MP1100, MP1150, and the like. The average primary particle size of the lubricating fluoropolymers is within a range of 0.01 to 1.5 μm, preferably from 0.01 to 0.5 μm, more preferably from 0.02 to 0.3 μm. If the particles are too small, they are ineffective for lubrication, if they are too large, they cause scattering of light and will result in loss of transparency of the layer. Typically, the fluoropolymer particles are present in the transparent magnetic layer from about 1 to about 60 wt. %, preferably in the amount from 10 to 50 wt. % relative to the weight of the binder.

The primary utility for transparent magnetic recording layers is in the imaging industry wherein an imaging element can be built onto a substrate that includes a transparent recording layer. One suitable technique would be to prepare the substrate for the film whether it be cellulose acetate, polyethylene terephthalate, polyethylene naphthalate, polycarbonate paper or other suitable substrate for that purpose with a transparent magnetic recording layer on one surface thereof. This again can be achieved either by coating applications widely known in both the photographic and magnetic recording fields of technology. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and others engaged in this field of endeavor. For example, when a camera also has the capability of imparting data to a magnetic layer by having built in recording heads in the camera, information with regard to each frame of the film can be recorded, such as, the light conditions, the speed at which the frame is exposed, the f-stop number and the like.

Transparent magnetic layers can be prepared by applying a coating composition prepared in water by dispersing the magnetic particles in an aqueous medium containing a hydrophilic binder, using a dispersing agent. A dispersing agent, sometimes referred to as a wetting agent or surface active agent can be present in the dispersion to facilitate dispersion of the magnetic particles, fluoropolymer particles, abrasive particles and/or filler particles with the dispersing medium. Suitable dispersing agents are described in U.S. Pat. No. 5,457,012. Examples of hydrophilic binders which can be used are those described in Research Disclosure No. 308119, December 1989, and No. 18716 (page 651) November 1979. Illustrative water dispersible binders include water-soluble polymers, gelatin, gelatin derivatives, cellulose esters, latex derivatives, casein, agar, sodium alginate, starch, polyvinyl alcohol, polyacrylic acid copolymers and maleic anhydride copolymers and mixtures thereof. The cellulose esters include hydroxyl propyl cellulose, carboxymethyl cellulose and hydroxyethyl cellulose. The latex polymers include vinyl chloride copolymers, vinylidene chloride copolymers, acrylic ester copolymers, vinyl acetate copolymers and butadiene copolymers. Among them, gelatin is most preferred.

Gelatin may be any of so-called alkali-treated (lime treated) gelatin which was immersed in an alkali bath, prior to extraction thereof, an acid-treated gelatin which was immersed in an alkali bath prior to extraction thereof, an acid-treated gelatin which was immersed in both baths and enzyme-treated gelatin. If necessary, gelatin can be used in combination with colloidal albumin, casein, a cellulose derivative (such as carboxymethyl or hydroxyethyl cellulose), agar, sodium alginate, a saccharide derivative (such as a starch derivative or dextran), a synthetic hydrophilic colloid (such as polyvinyl alcohol, poly-N-vinylpyrolidone, a polyacrylic acid copolymer, polyacrylamide or a derivative or partial hydrolyzate thereof) or a gelatin derivative.

The above described coating composition containing the dispersed magnetic particles, fluoropolymer particles, dispersant and film-forming hydrophilic binder is coated onto a suitable support either as is or along with additional or optional ingredients such as, abrasive particles, crosslinking or hardening agents, coating aids, matting agents, antistatic agents, fillers and the like, before the coating operation.

The coating composition is applied to a suitable support which may contain additional layers for promoting adhesion, by any suitable coating device including slot die hoppers, gravure coaters, reverse roll coaters and the like. The thickness of the magnetic layer preferably should be about 0.5 to about 10 $\mu$m, more preferably about 0.5 to about 5 $\mu$m and most preferably about 1 to about 3 $\mu$m.

Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Supports for photographic elements are described in Research Disclosure, December 1989, Item 308,119 published by Kenneth Mason Publications, Ltd., Dudley Annex, 12a North Street, Emsworth, Hampshire P010 7DQ, England, section XVII, incorporated herein by reference.

Particularly preferred supports are polyethylene terephthalate, polyethylene naphthalate and the cellulose esters particularly cellulose triacetate.

Thickness of those supports used in the present invention is from 50 $\mu$m to 180 $\mu$m, preferably, 85 to 125 microns. In addition, various dyes may be formulated into the support or the magnetic layer to give neutral density.

Depending upon the nature of the support, suitable transparent subbing or undercoat layers may be desired. Particularly with regard to polyester supports, primers are used in order to promote adhesion. Any suitable primers in accordance with those described in the following U.S. Pat. Nos. may be employed: 2,627,088; 3,501,301; 4,689,359; 4,363, 872; and 4,098,952. Each of these is incorporated herein by reference in their entirety.

The magnetic recording layer containing gelatin or other hydrophilic colloid is preferably hardened.

Hardeners usable for hardening the magnetic recording layer include, for example, aldehyde compounds such as formaldehyde and glutaraldehyde; ketone compounds such as diacetyl and cyclopentanedione; compounds having reactive halogens such as bis(2-chloroethylurea), 2-hydroxy-4, 6-dichloro-1,3,5-trizine and those described in U.S. Pat. Nos. 3,288,775 and 2,732,303 and British Patent Nos. 974,723 and 1,167,207; divinylsulfone, 5-acetyl-1,3-diacrylolhexahydro-1,3,5-triazine and reactive olefin-containing compounds such as divinylsulfone, 5-acetyl-1,2-diacryloyl-hexahydro-1,3,5-triazine, and the compounds such as divinylsulfone, 5-acetyl-1,3-diacryloyl-hexahydro-1,3,5-triazine, and the compounds disclosed in U.S. Pat. Nos. 3,635,718 and 3,232,763, and British Pat. No. 994,869; N-hydroxymethylothalimide; N-methylol compounds such as N-hydroxymethylphthalimide and those described in U.S. Pat. Nos. 2,732,316 and 2,586,168; isocyanates described in U.S. Pat. No. 3,103,437; the aziridines disclosed in U.S. Pat. Nos. 3,017,280 and 2,983,611; acid derivatives described in U.S. Pat. Nos. 2,725,294 and 2,725,295; epoxy compounds described in U.S. Pat. No. 3,091,537; and halogenated carboxyaldehydes such as mucochloric acid. Examples of inorganic hardeners include chrome alum, zirconium sulfate and the carboxyl group activating hardeners described in Japanese Patent Publication for opposition purpose (herein after referred to as J. P. Kokoku) Nos. 56-12853 and 58-32699, Belgian Patent No. 825,726, J. P. Kokai Nos. 60-225148 and 51-126125, J. P. Kokoku No. 58-50699, J. P. Kokai No. 52-54427 and U.S. Pat. No. 3,321,313.

The hardener is generally used in an amount of from 0.01 to 30 weight %, preferably from 0.05 to 20 weight %, to the amount of dried gelatin.

Examples of abrasive particles useful in the transparent magnetic layer of the present invention include nonmagnetic inorganic powders with a Moh's scale hardness of not less than 6. Specific examples are metal oxides such as alpha aluminum oxide, chromium oxide (e.g., $Cr_2O_3$), iron oxide alpha (e.g., $Fe_2O_3$), silicon dioxide, alumino-silicate and titanium carbide; carbides such as silicon carbide and titanium carbide; nitrides such as, silicon nitride, titanium nitride and diamond in fine powder. Alpha alumina and silicon dioxide are the preferred abrasives in accordance with this invention. These can be pre-dispersed in water and incorporated into the coating composition. The abrasive particles are present in the transparent magnetic recording layer in an amount of 0.5 to 100 $mg/m^2$.

Examples of reinforcing filler particles include nonmagnetic inorganic powders with a Moh's scale hardness of at least 6. Specific examples are metal oxides such as γ-aluminum oxide, chromium oxide, (e.g., $Cr_2O_3$), iron oxide (e.g., alpha-$Fe_2O_3$), tin oxide, doped tin oxide, such as antimony or indium doped tin oxide, silicon dioxide, alumino-silicate and titanium dioxide; carbides such as silicon carbide and titanium carbide; and diamond in fine powder. γ-Aluminum oxide and silicon dioxide are preferred. These can also be pre-dispersed in water using the same dispersants as described and then incorporated into the coating composition.

Tin oxide particles in any form may be employed such as tin oxide per se or doped tin oxides, such as, antimony or indium doped tin oxide. The tin oxide may be used in either the conductive or non-conductive form; however, when in the conductive form, an additional advantage is gained in that the layer also acts as an antistat. Suitable conductive particles are disclosed in U.S. Pat. Nos. 4,495,276; 4,394,441; 4,431,764; 4,418,141 and 4,999,276 incorporated herein by reference. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1. These can be also be pre-dispersed in water and then incorporated into the coating composition.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 $mg/m^2$ when uniformly distributed across the desired area of the photographic element will be sufficiently photographically transparent provided that the maximum particle size is less than about 1 micron. Particle concentrations less than about 10 $mg/m^2$ tend to be insufficient for magnetic recording purposes and particle concentrations greater than about 1000 $mg/m^2$ tend to be too dense for photographic purposes. Particularly useful particle concentrations are in the range of 20–70 $mg/m^2$. Concentrations of about 30 $mg/m^2$ have been found to be particularly useful in reversal films and concentrations of about 60 $mg/m^2$ are particularly useful in negative films.

The photographic elements according to this invention can contain one or more conducting layers such as antistatic layers and/or anti-halation layers such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide, zinc antimonate and vanadium pentoxide.

The following examples illustrate the preparation of a transparent magnetic recording layer in accordance with the present invention.

The present invention is illustrated by the following examples.

EXAMPLES 1–3

A finely divided concentrate of a magnetic material was made by milling 23.13 parts of Co-surface treated-γ-iron oxide powder supplied by Toda Kogyo under the trade designation CSF 4085V2 and 23.13 parts of a 50% by weight solution of the dispersant Syn Fac 8337 (sold by Milliken Chemical) in 65.3 parts deionized water in a media mill. The sample was milled for 2–3 hours until the average particle size was down to 0.25 microns.

To an aqueous solution of cowbone gelatin at 39° C. was added an aqueous solution of polystyrene sulfonate, sodium salt (National starch Co. TL 502) in the ratios shown in Table 1 and mixed well. To this was added the magnetic dispersion and the mixture stirred at that temperature to yield a fine dispersion of ferric oxide in the combined polyelectrolyte and gelatin. This mixture was treated with a ballmilled aqueous dispersion of abrasive particles (AKP50) followed by particles of TEFLON® 120 (T120, an aqueous dispersion of fluorinated ethylene propylene particles) also in ratios as described in Table 1.

The dispersions thus obtained were treated with a solution of the hardener, bis(vinyl sulfonyl methyl ether), and coated on gel subbed polyethylene terephthalate to a dry thickness of about 1 micron. Table 1 shows the various levels of T120 that were added to the coating melts.

TABLE 1

| EXAMPLES<br>Description<br>INGREDIENTS | 1<br>20%<br>T120 | 2<br>10%<br>T120 | 3<br>5%<br>T120<br>DRY COVERAGE mg/m². | 5<br>No<br>abrasive | 7 & 8<br>T120<br>overcoat |
|---|---|---|---|---|---|
| Gelatin | 1090 | 1157 | 1184 | 1130 | 1252 |
| TL502 | 60.3 | 63.5 | 65.7 | 62.4 | 68.9 |
| γ-Iron oxide | 59.2 | 59.2 | 59.2 | 59.2 | 59.2 |
| AKP-50 | 59.2 | 59.2 | 59.2 | 0 | 59.2 |
| T120 | 219 | 116 | 59.2 | 22.6 | 0 |
| Hardener | 87.2 | 92.6 | 94.7 | 90.4 | 100 |

EXAMPLE 4

A magnetic layer was coated as described in Example 1 except that half of the T120 was replaced with carnauba wax.

EXAMPLE 5

A magnetic layer in which the abrasive particles were not added was coated from the composition shown in Table 1.

EXAMPLE 6

A magnetic layer was coated as described in Examples 1 and subsequently overcoated with 23.7 mg/m² of carnauba wax.

EXAMPLES 7–8

A magnetic layer was coated as described in Table 1, without any added T120 and subsequently in Example 7, was overcoated with 32.3 mg/m2 T120 in a 64.6 mg/m² gelatin binder. In Example 8 the overcoat was 32.3 mg/m² T120 in a 64.6 mg/m² Witco Bond W232 binder.

EXAMPLE 9

The comparative Example 9 was prepared as described in Table 1 for Examples 7&8 except that the magnetic layer was overcoated with 47.4 mg/m² carnauba wax in place of the T120/binder overcoat.

Evaluation Methods

The resulting magnetic coatings were tested for their static and dynamic frictional behavior using a rotating drum friction tester at 25° C. and 50% RH. All examples of the invention were comparable to the comparative example in terms of frictional behavior as seen in Table 2 except for Example 3 (lower level of T120). The overall performance in terms of durability over the test period is also shown in Table 2. Again, except for Example 3 the rest showed anywhere from good to excellent performance.

TABLE 2

| | FRICTION | | |
|---|---|---|---|
| EXAMPLE # | INITIAL | RUNNING | PERFORMANCE |
| 1 | 0.25 | 0.13 | Excellent |
| 2 | 0.29 | 0.19 | Good |
| 3 | 0.37 | >0.5 | Fair |
| 4 | 0.35 | 0.11 | Very good |
| 5 | 0.27 | 0.13 | Excellent |
| 6 | 0.33 | 0.19 | Very good |
| 7 | 0.23 | 0.11 | Excellent |
| 8 | 0.29 | 0.12 | Good |
| 9 | 0.22 | 0.11 | Excellent |

The magnetic performance tests of Example 1 showed good signal uniformity, and good runability comparable to Example 9, all without a separate lubricating layer over the magnetic layer. Example 1 also showed no head clogging which is an improvement over Example 9. Example 4, which replaced half the teflon particles with carnauba wax, showed slightly inferior overall performance than Example 1. Example 5, which contained no abrasive particles for head cleaning performed very well. Example 6 shows that a separate overcoat of carnauba wax provides no improvement in overall performance. Examples 7 and 8 shows that a separate overcoat layer containing Teflon provides good overall performance of the magnetic layer; however, this does require an additional coating layer.

The invention has been described in detail with particular reference to certain preferred embodiments thereof, but it will be understood that variations and modifications can be effected within the spirit and scope of the invention.

What is claimed is:

1. An imaging element comprising:
   a support,
   at least one image forming layer superposed on one side of said support,
   a transparent magnetic layer superposed on said support comprising magnetic particles, fluorinated polymeric particles having a size of from 0.01 to 1.5 μm, and a water dispersible binder, said transparent magnetic layer having a weight ratio of magnetic particles to aqueous dispersible binder of from 0.1:100 to 30:100.

2. The imaging element of claim 1 wherein the fluorinated polymeric particles are selected from the group consisting of polytetrafluoroethylene, fluorinated ethylene polypropylene, and perfluoroalkoxy.

3. The imaging element of claim 1 wherein the fluorinated polymeric particles are present in an amount of from 1 to 60 weight percent relative to the weight of the aqueous dispersible binder.

4. The imaging element of claim 1 wherein the magnetic particles comprise at least 80% by weight of at least one ferromagnetic metal alloy and 20% or less of other components selected from the group consisting of Al, Si, S, Sc, Di, V, Cr, Mn, Cu, Zn, Y, Mo, Rh, Re, Pd, Ag, Sn, B, Ba, Ta, W, Au, Hg, Pb, La, Ce, Pr, Nb, Te, and Bi.

5. The imaging element of claim 1 wherein the magnetic particles have an average length of less than about 0.3 microns.

6. The imaging element of claim 1 wherein the magnetic particles have an axial ratio of about 5:1 to 6:1.

7. The imaging element of claim 1 wherein the magnetic particles have a specific surface area of at least 30m²/g.

8. The imaging element of claim 1, wherein the transparent magnetic layer further comprises abrasive particles.

9. The imaging element of claim 8, wherein the abrasive particles are selected from the group consisting of metal oxides, silicon dioxide, alumino-silicate, titanium carbide; silicon carbide, titanium carbide, silicon nitride, titanium nitride and diamond in fine powder.

10. The imaging element of claim 8, wherein the abrasive particles are present in an amount of 0.5 to 100 mg/m$^2$.

11. The imaging element of claim 1, wherein the water dispersible binder is selected from the group consisting of gelatin, gelatin derivatives, cellulose esters, latex derivatives, casein, agar, sodium alginate, starch, polyvinyl alcohol, polyacrylic acid copolymers and maleic anhydride copolymers, hydroxyl propyl cellulose, carboxymethyl cellulose, hydroxyethyl cellulose, vinyl chloride copolymers, vinylidene chloride copolymers, acrylic ester copolymers, vinyl acetate copolymers and butadiene copolymers.

12. The imaging element of claim 1, wherein the support is selected from the group consisting of cellulose diacetate, cellulose triacetate, cellulose propionate, cellulose butyrate, cellulose acetatepropionate, polyamides; polycarbonates, polyesters, polyethylene terephthalate, poly-1,4-cyclohexanedimethylene terephthalate, polyethylene 1,2-diphenoxyethane-4,4'-dicarboxylate, polybutylene terephthalate, polyethylene naphthalate, polystyrene, polypropylene, polyethylene, polymethyl-pentene, polysulfone, polyethersulfone, polyarylates, and polyether.

13. The imaging element of claim 1, wherein the transparent magnetic layer further comprises a hardener.

14. The imaging element of claim 13 wherein the hardener is selected from the group consisting of formaldehyde, glutaraldehyde, cyclopentanedione, bis(2-chloroethylurea), 2-hydroxy-4,6-dichloro-1,3,5-trizine, divinylsulfone, 5-acetyl-1,3-diacrylolhexahydro-1,3,5-triazine, 5-acetyl-1,2-diacryloyl-hexahydro-1,3,5-triazine, 5-acetyl-1,3-diacryloyl-hexahydro-1,3,5-triazine, N-hydroxymethylothalimide; N-methylol compounds, isocyanates, aziridines, acid derivatives, epoxy compounds, halogenated carboxyaldehydes, chrome alum, zirconium sulfate and carboxyl group activating hardeners.

15. The imaging element of claim 1, wherein the transparent magnetic layer further comprises filler particles.

16. The imaging element of claim 15, wherein the filler particles are selected from the group consisting of γ-aluminum oxide, chromium oxide, iron oxide, tin oxide, doped tin oxide, silicon dioxide, alumino-silicate, titanium dioxide, silicon carbide, titanium carbide, and diamond in fine powder.

17. The imaging element of claim 1, wherein the transparent magnetic layer is furthest from the support.

18. A photographic element comprising:
a support,
at least one light-sensitive silver halide emulsion layer superposed on one side of said support,
a transparent magnetic layer superposed on said support comprising magnetic particles, fluorinated polymeric particles having a size of from 0.01 to 1.5 μm, and an water dispersible binder, said transparent magnetic layer having a weight ratio of magnetic particles to aqueous dispersible binder of from 0.1:100 to 30:100.

19. An imaging element comprising:
a support,
at least one image forming layer superposed on one side of said support,
a transparent magnetic layer superposed on said support comprising magnetic particles, and
a transparent overcoat layer, farthest from the support comprising fluorinated polymeric particles having a size of from 0.01 to 1.5 μm, and a water dispersible binder.

* * * * *